United States Patent
Samad et al.

(10) Patent No.: US 8,904,020 B2
(45) Date of Patent: Dec. 2, 2014

(54) METHOD WHICH PERMITS A BLOCK-BASED FILE TO BE PLAYED OUT DURING TRANSMISSION

(75) Inventors: Wissam Abdel Samad, Ort (DE); Andreas Arnold, Stadt (DE); Hrvoje Jenkac, Stadt (DE); Thomas Stockhammer, Stadt (DE); Wen Xu, Stadt (DE)

(73) Assignee: QUALCOMM Incorporated, San Diego, CA (US)

( * ) Notice: Subject to any disclaimer, the term of this patent is extended or adjusted under 35 U.S.C. 154(b) by 1666 days.

(21) Appl. No.: 12/300,315

(22) PCT Filed: May 9, 2007
(Under 37 CFR 1.47)

(86) PCT No.: PCT/EP2007/065593
§ 371 (c)(1),
(2), (4) Date: Jun. 30, 2011

(87) PCT Pub. No.: WO2007/128830
PCT Pub. Date: Nov. 15, 2007

(65) Prior Publication Data
US 2011/0305266 A1    Dec. 15, 2011

(30) Foreign Application Priority Data
May 10, 2006    (DE) .......................... 10 2006 021 846

(51) Int. Cl.
| | |
|---|---|
| G06F 15/16 | (2006.01) |
| H04N 21/44 | (2011.01) |
| H04N 21/4402 | (2011.01) |
| H04N 21/43 | (2011.01) |
| H04L 29/06 | (2006.01) |

(52) U.S. Cl.
CPC ..... *H04N 21/4402* (2013.01); *H04N 21/44004* (2013.01); *H04L 65/4084* (2013.01); *H04N 21/4302* (2013.01); *H04L 65/4007* (2013.01)
USPC .......................................... 709/229; 709/231

(58) Field of Classification Search
CPC ......................... H04L 65/4084; H04L 65/4007
USPC .................................................. 709/229, 231
See application file for complete search history.

(56) References Cited

U.S. PATENT DOCUMENTS

2002/0095683 A1* 7/2002 Watanabe ...................... 725/90

* cited by examiner

*Primary Examiner* — Adnan Mirza
(74) *Attorney, Agent, or Firm* — Mahamedi Paradice LLP

(57) ABSTRACT

A file (FI) is transmitted via a first channel (CH1). In addition, a second channel (CH2) is used to transmit play parameters ($D_1$, $D_2$, $R_1$, $R_2$) which comprise at least one set ($D_i$, $R_i$) of information about a play rate ($R_1$, $R_2$) and a delay time ($D_1$, $D_2$) for the file (FI) which is to be transmitted by the first channel (CH1). On the basis of the play parameters ($D_1$, $D_2$, $R_1$, $R_2$), it is possible to determine a time for starting to process the file (FI) which is to be transmitted.

46 Claims, 4 Drawing Sheets

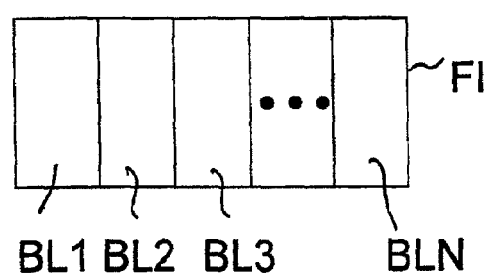

METHOD WHICH PERMITS A BLOCK-BASED FILE TO BE PLAYED OUT DURING TRANSMISSION

Figure 1:
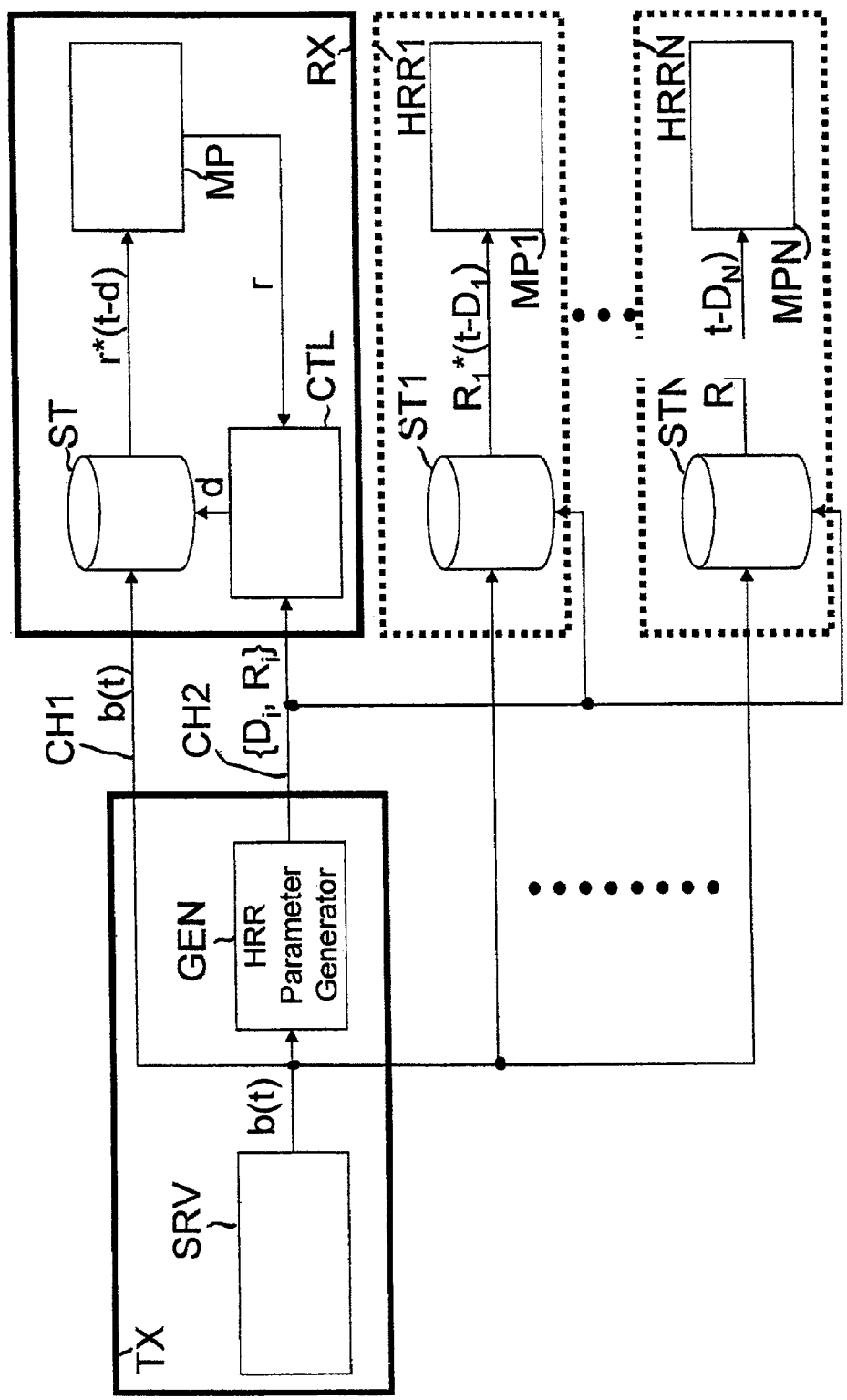

The invention relates to a receiving device for the block-based reception of files via a first channel, to a transmitting device for the block-based transmission of files via a first channel, and to a system for file transmission. The invention also relates to a method for the block-based reception of a file and to a method for the block-based transmission of a file.

During transmission of data, a distinction can be made inter alia between a broadcast transmission and a point-to-point transmission. During a broadcast transmission, the data or a file is/are transmitted by a transmitter simultaneously to many receivers, whereas during a point-to-point transmission the data transmission takes place in each case from one transmitter to one receiver. A distinction can also be made between data transmission according to a streaming process, in which a continuous data stream is transmitted, and a download process, in which a file-transmission is performed in each case for an individual file which can be considered as a completed unit.

In the case of a download process, files, in particular multimedia files provided e.g. in MP3 format can be played out, if at least one contiguous part is downloaded from the beginning of the corresponding file and the remainder of the file continues to be downloaded during playout. This can be referred to as "early playout". However, if for example a rate, i.e. a data quantity per time segment, at which the file is played out, is greater than the rate at which the file continues to be downloaded, a situation can arise in which the receiver no longer has sufficient data available for further playout and the playout procedure can be interrupted or aborted.

In the case of point-to-point connections, transmitters and receivers can exchange information in both directions as to when a suitable point in time is reached, from which the downloaded file can be played out without any delay or interruption. In broadcast systems, such as Multimedia Broadcast Multicast Service MBMS or Digital Video Broadcasting-Handheld, DVB-H, there is no backwards communication from the receiver to the transmitter. Files are transmitted according to the download process e.g. via the File Delivery Over Unidirectional Transport Protocol, the FLUTE protocol. Although a receiver is able to recognise that an even only partially downloaded file can be processed or played out early, the lack of backwards communication with the transmitter means that it does not have the ability to coordinate the point in time for commencement of processing with the transmitter. Therefore, the receiver can wait, for example, until a file is completely downloaded or can commence playout at any point in time, at which it is accepted on the receiver-side that the interruptions described can occur.

It is the object of the invention to provide a receiving device, a transmitting device and a system for file transmission, in which on the receiver-side the file can be processed without any delay during downloading of a file. It is also the object of the invention to provide methods for the reception and transmission of a file, in which on the receiver-side the file can be processed without any delay during downloading of a file.

These objects are achieved by the subject matter of the independent claims. Embodiments and developments of the invention form the subject matter of the subordinate claims.

In one embodiment, a receiving device is provided for the block-based reception of files via a first channel. The receiving device comprises means for the reception of play parameters via a second channel, which means comprise at least one set of information relating to a play rate and a delay time for a file which is to be received via the first channel. Furthermore, the receiving device comprises an evaluating device for determining a point in time for commencement of processing of the received file in dependence upon the play parameters.

In the receiving device, a file is to be received via the first channel. The file can be e.g. a multimedia file which can comprise certain time information. Play parameters are transmitted via a second channel. The first and second channels are formed e.g. as logic channels. The play parameters can comprise one set or several sets of information which each include a play rate and a delay time for the file to be received. The delay time can represent information relating to a point in time, from which processing of the file can be performed without any delay or interruption, if the file is played at the associated play rate. The point in time is determined in the evaluating unit, e.g. from the point in time of commencement of reception and the delay time.

By determining the point in time in dependence upon the play parameters which are transmitted in addition to the file, it is thus possible to commence processing, e.g. playout, of the file prior to completion of downloading or reception of the file via the first channel.

The play parameters can be understood as a form of guarantee or recommendation by the transmitter that a receiver which plays the file at a predetermined play rate can commence processing from the beginning of reception, e.g. of a first byte of the file, after the transmitted delay time.

The receiving device can comprise an intermediate storage device which is arranged to buffer the file to be received and to deliver it as a data stream from the predetermined point in time to an output of the intermediate storage device. In so doing, the data stream can be delivered at a constant play rate. Therefore, it is possible to guarantee a continuous data stream for processing of the file. For example, a data stream can therefore be taken from the intermediate storage device at a data rate or play rate which corresponds substantially to a playout rate of the file. By virtue of the fact that the data stream is only delivered from the predetermined point in time, it is possible to ensure that the data stream is delivered without any interruption. The data stream is delivered e.g. at a constant bit rate.

In one aspect of the invention, the evaluating device is arranged to determine the point in time in dependence upon reception conditions of the first channel and upon file characteristics of the file to be received. For example, the reception conditions of the first channel comprise a reception rate of data of the first channel. The file characteristics of the file can comprise a playout rate of the file. Therefore, in addition to the play parameters it is possible to evaluate the data rate, at which the file which is received via the first channel can be played out e.g. by a media decoder connected downstream. It is possible e.g. to select a set of information which best corresponds to the playout rate of the file. Other combinations of information in the channel can be utilised in order to determine an adequate point in time of playout for the playout rate of the file. For selecting the point in time of playout, it is also possible to take into account the data requirement of a processing device, e.g. a playout device, via the playout rate.

The at least one set of information can include e.g. a first indicator of transmission characteristics of the first channel. The first indicator can indicate a loss rate of the first channel.

The at least one set of information can also include a second indicator of transmission characteristics of the first channel. It is possible that the second indicator indicates a probability of achieving the playout rate of the first channel or a probability of the frequency of the need to interrupt and buffer the playout in the first channel if the receiver experiences the transmission characteristics corresponding to the first indicator. Therefore, it is possible to take into account e.g. packet losses in an Internet protocol, IP-based connection for determining the point in time. The second indicator can include e.g. the probability that the receiver can adhere to the associated play rate for a media file which is received via the first channel. However, it can also provide information relating to the probability of data being buffered in the first channel. For example, it indicates the frequency of the need to interrupt and buffer the playout in the first channel if the receiver experiences the transmission characteristics corresponding to the first indicator.

One or several sets of information which can include a play rate, a delay time, one or several of the indicators or further parameters are evaluated in a receiving device and serve to ascertain a suitable point in time for the commencement of play or processing of the file to be transmitted. One set can be interpreted as a guarantee on the part of a transmitter that the transmission conditions established by the set are intended to apply to a receiver which complies with the transmission conditions. Consequently, a receiving device which adheres to the specifications in accordance with the set of information can commence processing of the file successfully and without delay at the ascertained point in time. Therefore, in an improved manner it is possible that during downloading of a file, the file can be processed without any delay.

In a further aspect of the invention, the at least one set of information can comprise a parameter relating to the time duration for which the set of information is valid in each case. As a consequence, the transmitter can specify e.g. the duration of a transmission session, i.e. the duration until complete reception of the file. Alternatively, the duration of a media file which is transmitted can thus be transmitted.

The means for receiving can be arranged in such a manner that the play parameters are received prior to the file which is to be received. Therefore, it is possible to guarantee the earliest possible determination of the point in time for processing.

The receiving device can receive the file, which is to be received, in blocks. In so doing, the blocks which are received can be provided with error correction data. The blocks can also be received in various ways. For example, the blocks are received sequentially. Alternatively, the first channel comprises several partial channels and the receiving device receives the blocks in parallel via the partial channels. The partial channels can also be formed as logic channels.

The blocks can also be received according to a spreading process or interleaving process. In so doing, the sequence of transmitted blocks can be changed, in that e.g. partial blocks of a block are received between partial blocks of another block. The blocks can also be received repeatedly. This can be referred to as a carrousel process. The blocks can be received using a fountain code. In this respect, the blocks are encoded according to the digital fountains principle. The blocks can also be received according to the FLUTE protocol.

In a preferred manner, data according to the forward error correction process FEC is utilised for the error correction data.

The various ways of receiving the file in blocks are to be taken into account when determining the point in time for processing.

In a further embodiment, a transmitting device for the block-based transmission of files via a first channel comprises means for transmitting play parameters via a second channel. The means for transmitting comprise at least one set of information relating to a play rate and a delay time for a file which is to be transmitted via the first channel.

In the transmitting device, a file can be transmitted via the first channel to a receiver. The receiver can be e.g. a receiving device in accordance with the invention. Play parameters are transmitted via a second channel to the receiving device. The receiver can evaluate these play parameters and in dependence upon the play rate and the delay time can select a point in time, from which it starts processing the file transmitting via the first channel. The play parameters are configured in such a manner that from the selected point in time interruption-free processing is possible in the receiver, while the file continues to be transmitted or received.

The delay time can thus represent information relating to a point in time, from which the file to be transmitted can be processed in a receiving device without any delay, if the file which is received via the first channel is played at the play rate. The delay-free and interruption-free processing of the file, i.e. playout of the file, is to be guaranteed up to the end of the file.

In one aspect of the invention, the at least one set of information includes a first indicator of transmission characteristics of the first channel which indicates a loss rate of the first channel. The at least one set of information can include a second indicator of transmission characteristics of the first channel. The second indicator can indicate a probability of achieving the play rate for a file sent or transmitted via the first channel. The second indicator can also indicate a probability of buffering in the first channel.

The at least one set of information which is transmitted by the transmitting device can include a parameter relating to a time duration, for which the set of information is valid. For example, the duration of a media file which is transmitted can thus be transmitted.

In a further aspect of the invention, the means for transmitting are arranged in such a manner that the play parameters of the file, which is to be transmitted, are transmitted. As a consequence, the receiving device is able to establish the point in time for commencement of processing or the beginning of playout early prior to or during reception of the file. In another aspect of the invention, the transmitting device comprises a device for generating the play parameters. For example, the play parameters are derived from parameters which are assumed by the transmitting device to be hypothetical for a receiving device, such as e.g. transmission characteristics of the first channel. In addition, the play parameters can be derived e.g. from the form of transmission as determined by the transmitting device, or from other parameters.

The transmitting device can also comprise a device for storing the play parameters. Therefore, play parameters ascertained beforehand can be stored and in each case transmitted when needed via the transmitting means.

The transmitting device can transmit the file, which is to be transmitted, in blocks via the first channel, wherein the blocks are transmitted in a corresponding manner as described previously in the case of the receiving device in accordance with the invention.

In a further embodiment, a system for file transmission comprises a first channel for a block-based transmission of files and a second channel for transmission of play parameters which comprise at least one set of information relating to a play rate and one delay time for a file which is to be transmitted via the first channel. The system also comprises a transmitting device for transmitting the file via the first channel and for transmitting the play parameters via the second channel and a receiving device for receiving the file and the play parameters. The delay time represents information relating to a point in time, from which the file can be processed in the receiving device without any delay, if the file which is received in the first channel is played at the play rate.

This ensures that during downloading of the file the receiving device can commence processing of the file, wherein the processing is performed without any delay and interruption up to the end of the file.

The at least one set of information can include a first indicator of transmission characteristics of the first channel which indicates a loss rate of the first channel. Furthermore, the at least one set of information can also include a second indicator of transmission characteristics of the first channel which indicates a probability of achieving the playout rate of the file received via the first channel, or indicates a probability of the frequency of an interruption in playout and a resulting intermediate buffering of the files transmitted via the first channel.

In the system the at least one set of information can include a parameter relating to a time duration, for which the set of information is valid. The transmitting device of the system can be arranged for the purpose of transmitting the play parameters prior to the file.

The file can also be transmitted in the system in blocks. The possible ways of transmitting the blocks corresponds to the possibilities described in the case of the receiving device in accordance with the invention.

A further embodiment of the invention provides a method for the block-based reception of a file. The file is received via a first channel. In addition, play parameters are received via a second channel which include at least one set of information relating to a play rate and a delay time for the file to be received via the first channel. In dependence upon the play parameters, a point in time is determined for commencement of processing of the file.

Since the point in time which is determined from the play parameters can also be before the end of a complete transmission of the file, delay-free processing of the file is still made possible during downloading of the file.

In one aspect of the method, the file is buffered in an intermediate storage device and is delivered as a data stream from the determined point in time to an output of the intermediate storage device. The data stream can be delivered at a constant play rate. Therefore, a continuous data stream can be guaranteed for processing of the file.

In one aspect of the method, the point in time is determined in dependence upon reception conditions of the first channel and upon file characteristics of the file. For example, the reception conditions of the first channel comprise a reception rate of the first channel. Therefore, when determining the point in time a real reception rate for data of the first channel can be set in relation to the play rate from the at least one set of information. Furthermore, the file characteristics of the file can include a playout rate of the file. This serves to establish the rate at which data must be provided for processing of the file, in order to be able to ensure interruption-free processing. Furthermore, the transmission rate can also be delivered in the set of information and taken into account during determination of the point in time.

In a further aspect of the method, the at least one set of information includes a first indicator of transmission characteristics of the first channel, wherein the first indicator indicates e.g. a loss rate of the first channel. The at least one set of information can also include a second indicator for transmission characteristics of the first channel, wherein the second indicator can indicate a probability of achieving the playout rate of the first channel or a probability of the frequency of an interruption and a resulting intermediate buffering of the file received via the first channel. The at least one set of information can also include a parameter relating to a time duration, for which the set of information is valid.

In a further aspect of the method, the play parameters are received prior to the file which is to be received.

A further embodiment of the invention provides a method for the block-based transmission of a file. Play parameters are transmitted via a second channel which include at least one set of information relating to a playout rate and a delay time for the file which is to be transmitted via a first channel. The file to be transmitted is transmitted via the first channel. The play parameters transmitted via the second channel ensure that during sending or transmission of the file it is possible on the receiver-side to commence processing of the file without interruptions occurring during processing.

The delay time can represent information relating to a point in time, from which processing of the file, which is to be transmitted, can be performed at the play rate in receiving device without any delay. This can apply in particular if the file is transmitted in the first channel at a fixed transmission rate.

In one aspect of the method, the at least one set of information includes a first indicator of transmission characteristics of the first channel which indicates a loss rate of the first channel. The at least one set of information can also include a second indicator of transmission characteristics of the first channel, wherein the second indicator can indicate a probability of achieving the play rate of the first channel or a probability of the frequency of an interruption in play at the play rate and a resulting intermediate buffering of the file received via the first channel. The at least one set of information can include a parameter relating to a time duration, for which the set of information is valid.

In a preferred manner, the play parameters are transmitted prior to the file which is to be transmitted.

Figure 2:
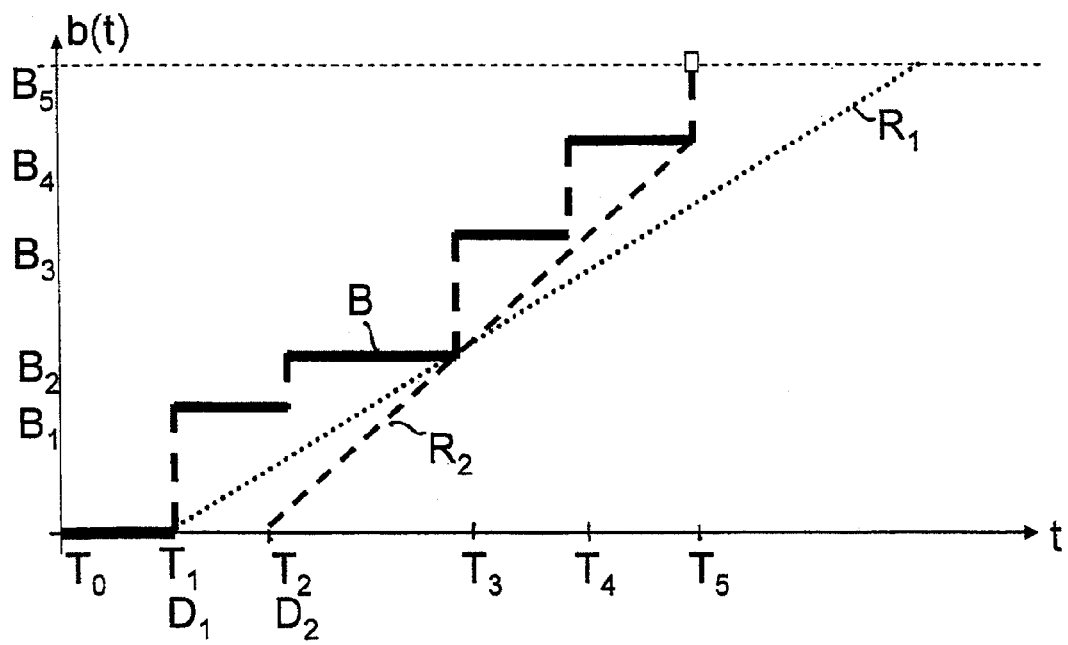
Figure 3:
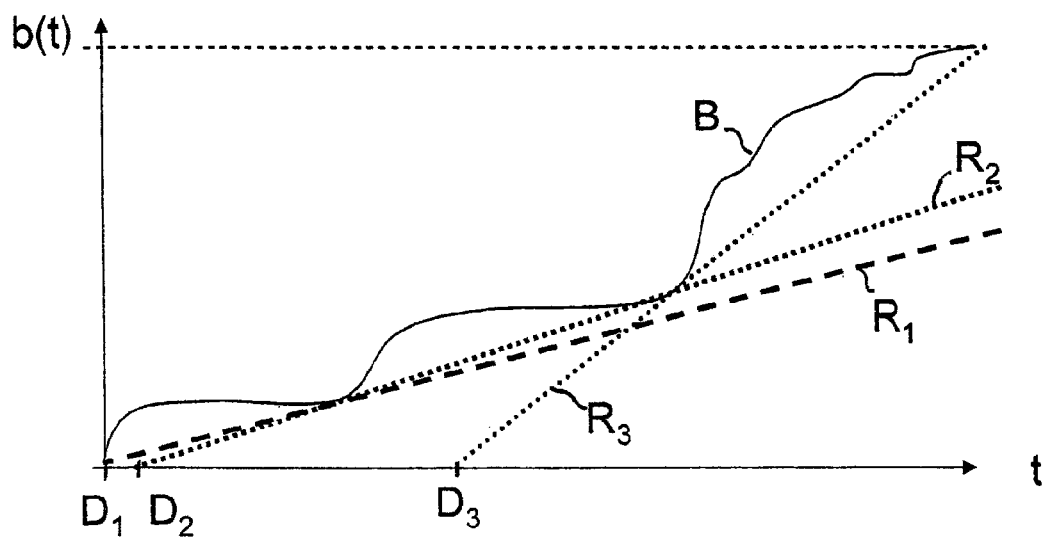
Figure 4:
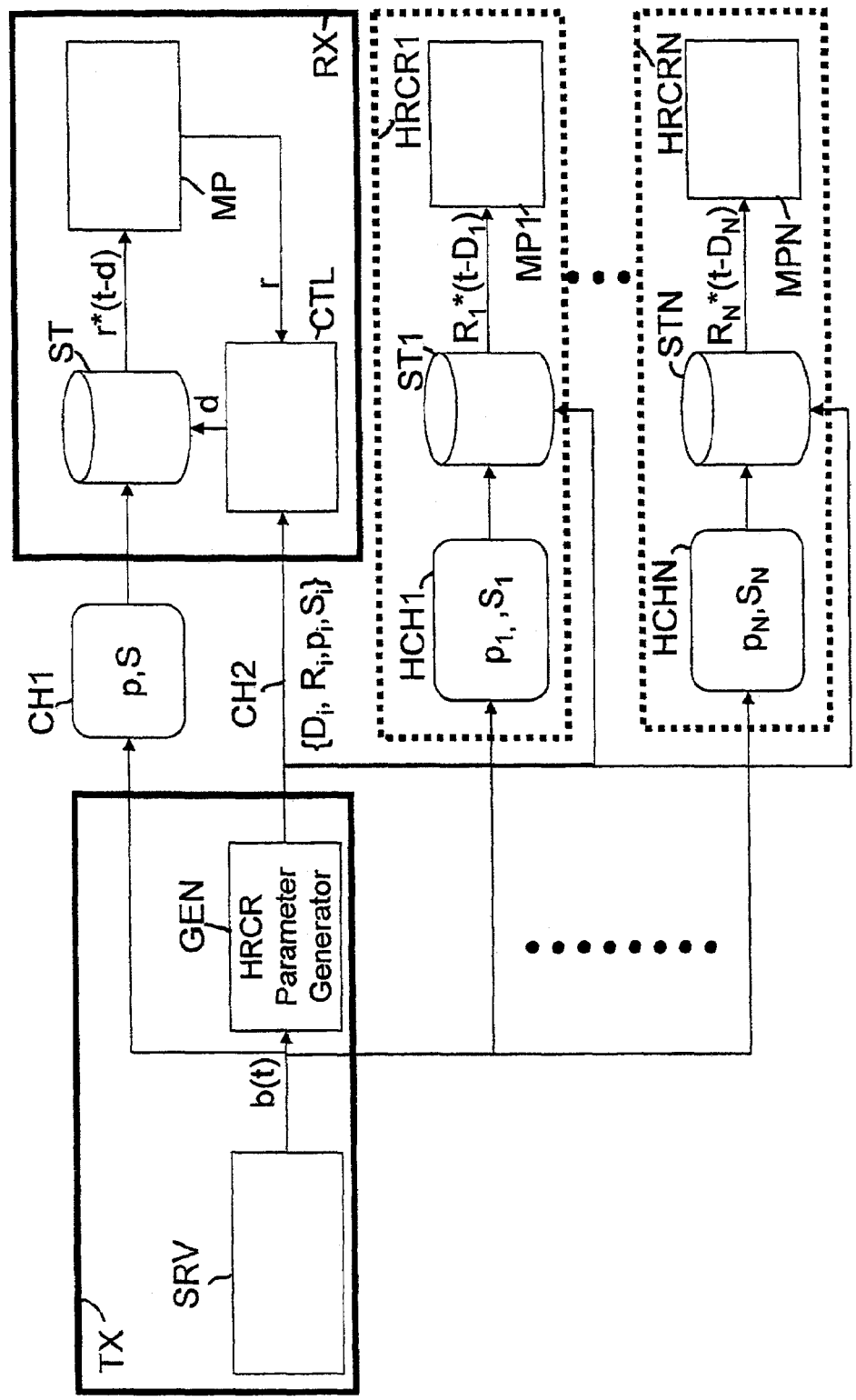

The invention will be explained in detail hereinunder by exemplified embodiments with reference to the drawings, in which FIG. 1 shows a first exemplified embodiment of an arrangement in accordance with the invention, FIG. 2 shows a first graph of an exemplary transmission over time, FIG. 3 shows a second graph of an exemplary transmission over time, FIG. 4 shows a second exemplified embodiment of an arrangement in accordance with the invention, and FIG. 5 shows an exemplified embodiment for division of a file in accordance with the invention.

FIG. 1 illustrates a first exemplified embodiment of an arrangement in accordance with the invention having a transmitting device TX and a receiving device RX. In order to transmit files from the transmitting device TX to the receiving device RX, a first channel CH1 is provided. Play parameters $D_i$, $R_i$ are transmitted via a second channel CH2. The transmitting device TX is provided with a device SRV for making available the file which is to be transmitted and which is formed e.g. as a file server. Furthermore, the transmitting device TX comprises a parameter generator GEN which comprises means for transmitting play parameters $D_i$, $R_i$ and a device for generating the play parameters $D_i$, $R_i$. The parameter generator GEN is connected on the input-side to the first channel CH1, in order to be able to deliver corresponding play parameters $D_i$, $R_i$ in dependence upon the data on the first channel CH1. A transmission rate could also be delivered via the play parameters.

The receiving device RX comprises an intermediate storage device ST which is connected on the input-side to the first channel. The intermediate storage device can be formed by a main storage device or any other storage medium. Furthermore, the receiving device RX comprises an evaluating device CTL which is connected to the second channel CH2. By way of example, a media player MP is also provided which can receive a data stream from the intermediate storage device ST. In this exemplified embodiment, the media player MP serves at the same time to ascertain a playout rate r which is delivered to the evaluating device CTL and the rate at which the intermediate storage device ST is to deliver the data to the media player MP.

In addition, two of several models of reference receivers HRR1 and HRRN are illustrated by way of example and can also be defined as hypothetical reference receivers. The hypothetical reference receivers HRR1, HRRN represent in each case a hypothetical model for a receiving device, in which processing of the file to be transmitted or playout at a rate $R_1$ or $R_N$ can be accomplished if at the beginning of playout or processing a delay time $D_1$ or $D_N$ is effected. To this end, the hypothetical reference receivers HRR1, HRRN are provided with hypothetical intermediate storage devices ST1, STN and hypothetical media players MP1, MPN. In the case of the hypothetical reference receivers HRR1, HRRN, it is assumed that in the first channel CH1, optimum transmission conditions prevail in such a manner as if they were connected directly to the output of the transmitting device TX.

The transmitter gives a guarantee to the hypothetical reference receivers HRR1, HRRN that if a delay of at least $D_1$ or at least $D_N$ is effected, a play rate of up to $R_1$ or up to $R_N$ can be maintained. These play parameters $D_i, R_i$ which describe a hypothetical reference receiver are then utilised by the real receiver RX, in order to determine, together with the required playout rate r of the media file, a favourable point in time for playing.

The illustrated arrangement can be utilised e.g. for a broadcast transmission according to the MBMS or the DVB-H standard. The first and second channels CH1, CH2 are generally logic channels in a transmission system. For example, a channel represents a connection on a level or layer of the Open Systems Interconnection Reference Model, OSI model which is a layer model. A channel can also be formed via several partial channels.

The transmitting device TX is disposed e.g. in a base station for a mobile radio system or in a Broadcast-Multicast Switching Centre in a mobile radio network. The receiving device RX can be comprised of a mobile receiving device, e.g. a mobile radio unit.

For example, the first channel CH1 serves to transmit a multimedia file, i.e. a music file in MP3 format or a file according to the 3G specification with the suffix 3gr6 according to the "progressive download" process.

FIG. 2 illustrates an exemplary progression with respect to time of data b(t), to be transmitted, of a file via the first channel CH1. The stepped curve B illustrates the progression of the amount of data transmitting, as performed effectively via the first channel. Transmission is performed in this case in blocks, so that at time $T_1$ the quantity $B_1$ is available at a receiving device, at time $T_2$ the quantity $B_2$, at time $T_3$ the quantity $B_3$, at time $T_4$ the quantity $B_4$ and at time $T_5$ the quantity $B_5$, which corresponds to the completely transmitting file.

A hypothetical reference receiver HRR1, in which the file is to be processed at a play rate $R_1$ has to adhere to a delay time $D_1$ according to the graph, in order to be able to ensure interruption-free processing.

Accordingly, for a hypothetical reference receiver having a play rate $R_2$, a delay time $D_2$ is to be provided, in order to permit interruption-free processing.

FIG. 3 illustrates a further time graph for the transmission of a file. The exemplary transmission progression B of a first channel represents a continuously received file with a variable bit rate. Various combinations of sets of information $D_1$, $R_1$ or $D_2$, $R_2$ or $D_3$, $R_3$ represent possible hypothetical reference receivers.

By transmitting the play parameters $D_i, R_i$ to the hypothetical reference receivers HRR1, HRRN or the receiving device RX, the transmitting device TX in FIG. 1 provides a guarantee that at a predetermined transmission rate it is possible to process or play the file without interruption at a rate up to the play rate $R_i$, if a delay time of at least $D_i$ is maintained. This guarantee is based upon the device of the transmission session, the transmission behaviour of the transmitting device TX and an encoding behaviour e.g. of the device SRV. In particular, it is necessary to take into account the characteristic of a forward error correction. A transmission rate relates e.g. to the transmission via a specific layer according to the OSI model which is below the layer on which the FEC is applied.

Various sets of information $D_i, R_i$ can also be adapted to changed transmission behaviour of the transmitting device TX. For example, a change in an instantaneous transmission rate of the file, interleaving of the file, i.e. transmission in a non-continuous sequence, repeated transmission of the file in any manner, or the formation of blocks within the file should be taken into account.

FIG. 5 illustrates e.g. how a file FI is divided into several blocks BL1, BL2, BL3 to BLN. The division can be performed e.g. in the case of a transmission according to the FLUTE protocol, a systematic encoding for a forward error correction at a specific code rate or for a non-systematic encoding for a forward error correction at a specific code rate. Equally, the transmission behaviour of the transmitting device TX can change, if an encoding is performed according to the digital fountain principle at a very low code rate or a code rate which is almost zero.

If the characteristic curves illustrated in FIG. 2 and FIG. 3 and having the play rates $R_1, R_2, R_3$ do not achieve at any point, i.e. at any point in time, a data quantity which is greater than the respective data quantity b(t) of the characteristic curve B, they represent a measurement of the assumed transmission behaviour of the transmitting device TX. An appropriate image of the expected transmission behaviour of the transmitting device TX can thus be imparted via the sets of information $D_i, R_i$ to the receiving device RX. It is necessary to note that only the associated portion of the file from the beginning of the file onwards can be regarded as relevant, although in specific transmission processes such as interleaving, data which can be allocated at a later stage in terms of time can arrive considerably earlier than data in front thereof. It should also be noted that the availability of data in the receiver says nothing as to whether the data are still being decoded prior to processing, e.g. are to be reconstructed by exploiting the forward error protection, or can be directly processed or played out.

The play parameters $D_i, R_i$ are evaluated in the evaluating device CTL together with local information, i.e. information relating to reception characteristics of the first channel CH1, file characteristics of the transmitting file, and a playout rate or even local security clearances or delay parameters. It is therefore possible to ascertain a local delay time d which indicates how long e.g. the intermediate storage device ST is to wait from the reception of the beginning of the file until a continuous data stream is delivered to the media player MP. The expression r*(t−d) corresponds to a data quantity which is processed and played at time t. Therefore, in the receiving device RX a data stream with a constant bit rate is emulated so to speak by the intermediate storage device ST and the local delay time d. For example, the reception of a first byte of the file can be defined as the beginning of reception of the file.

The transmitting device TX can frequently be based upon a deterministic behaviour during transmission of the file via the first channel. However, since the transmitting device TX under certain circumstances does not have any influence upon transmission characteristics of the first channel CH1, a transmission via the first channel CH1 is also dependent upon random processes. For example, parts of the file which is to be transmitted will be lost with a specific probability p, e.g. by virtue of lost IP packets. In order to calculate the effective delay time d in the receiving device RX, it is also possible to take into account various delay times of the channel CH1. For example, the channel CH1 can have a fixed delay by reason of running times, interleaving, forward error correction or other causes. This channel delay time can be incorporated e.g. with respect to the delay time of the play parameters $D_i$ into the determination of the delay.

In some cases, the delay of the channel is not deterministic but rather is random. This can occur by reason of repeated transmissions on lower transmission layers, interleaving, malfunctions, prioritisation, statistical multiple access or for other reasons. Nevertheless, in many transmission networks such as e.g. wireless networks, a quality guarantee for services, Quality of Service QoS, is provided in the form of a maximum delay. In this case, this maximum delay should also be incorporated into the determination of the effective delay d. Several hypothetical receivers on various protocol levels could be taken into account and jointly also incorporated into the determination of the effective delay d.

If a change in the delay time of the channel is random but no guarantees are given for a transmission, the receiving device RX should determine an effective delay time d, for which a data stream having a constant bit rate is facilitated e.g. from the intermediate storage device ST. The play parameters $D_i$, $R_i$ transmitted by the transmitting device can still also be incorporated into the determination of the effective delay time d.

FIG. 4 illustrates a further exemplified embodiment of an arrangement in accordance with the invention. Like devices in terms of function and effect are designated by like reference numerals. In contrast to FIG. 1, FIG. 4 does not illustrate the hypothetical reference receivers HRR1, HRRN but rather hypothetical reference channel receivers HRCR1, HRCRN which additionally comprise in each case a hypothetical channel HCH1, HCHN. The characteristics of the hypothetical channels HCH1, HCHN are characterised by indicators transmission characteristics $p_1$, $S_1$, $p_N$, $S_N$ [sic]. For example, the indicators $p_1$, $p_N$ represent a loss rate of the respective channel, i.e. the portion of transmitted packets which typically does not arrive at the receiver. A further indicator $S_1$ or $S_N$ indicates e.g. a probability of achieving the play rate of the respective channel, if the loss rates are $p_1$ or $p_N$.

The play parameters $D_i$, $R_i$, $p_i$, $S_i$ for the respective hypothetical reference channel receivers HRCR1, HRCRN are transmitted via the second channel CH2 to the evaluating unit CTL of the receiving device RX. A determination of an effective delay time d can be ascertained as previously on the basis of the local parameters, the delay times $D_i$, the play rates $R_i$ then also in addition with probability models for the hypothetical channels.

For the purpose of transmitting the file, the transmitting device TX can divide the file into individual blocks. The entire file or the individual blocks are divided into symbols which serve as source symbols for a block code. In relation to the block size, the block code can be generic and flexible. For each block, a specific quantity of parity symbols is produced which either for a systematic code contain the original symbols or for a non-systematic code do not contain the symbols.

All or only some of the generated symbols can be transmitted to a reception-side decoder, not illustrated in this case. Even if some or many of the transmitted symbols are not available, the decoder attempts to restore the block and thus also the entire file. In so doing, various transmission strategies or various transmission behaviours can then be applied. The basis thereof is e.g. the applied block size and the algorithm for block formation, the repetition of data, the encoding rate utilised, the interleaving of encoding symbols, which are associated with various source blocks, the transmission via various partial channels, guarantees of various protocol layers or even the use of repeated transmission or encoding according to the digital fountain principle.

In the parameter generator GEN in the transmitting device TX, it is possible for various combinations of sets of information to be generated as play parameters and to be transmitted to the receiving device RX. By transmitting the play parameters $D_i$, $R_i$, $p_i$, $S_i$, a guarantee is provided e.g. to a hypothetical reference channel receiver that with an assumed channel loss probability $p_i$ a data stream can be played or processed at a constant bit rate of up to $R_i$ with a probability of success $S_i$, if from the beginning of reception of the file a delay time of at least $D_i$ is effected.

The play parameters in accordance with the invention can be transmitted e.g. as an additional parameter in the session description protocol, SDP. An example of parameters of an MBMS download session in which the FLUTE protocol is utilised is provided hereinunder:

v=0
o=user123 2890844526 2890842807 IN IP6
   2201:056D: : 112E : 144A: 1E24
S=File delivery session example
i=More Information
t=2873397496 2873404696
a=mbms-mode:broadcast 1234
a=FEC-declaration:0 encoding-id=1
a=source-filter: incl IN IP6 *
   2001 :210: 1:2:240: 96FF :FE25:8EC9
a=flute-tsi:3
m=application 12345 FLUTE/UDP 0
C=IN IP6 FF1E:03AD::7F2E: 172A:1E24/1
b=64
a=lang:EN
a=FEC:0
a=hrr: 2000,128, 5000, 256 7000, 384 13000, inf The respective first number in the HRR attribute in the last line represents the delay time in milliseconds, whereas in each case the second number indicates a possible play rate of the [lacuna] in kBit/s. With these parameters, the transmitter declares that if a hypothetical reference receiver waits for at least 2000 ms it will be able to play a data rate of up to 128 kBit/s, if it waits for at least 5000 ms it will be able to play a data rate of up to 256 kBit/s and if it waits for at least 7000 ms it will be able to play a data rate of up to 384 kBit/s. If it waits for at least 13000 ms it is guaranteed that the receiver has received the entire file and can play or process it all at once or completely, e.g. in the case of an image file or a program code. The transmission rate is fixed in this case to 64 kBit/s which is relayed by the field b=64 to the receiver.

As an example of a hypothetical reference channel receiver, the play parameters can be transmitted e.g. in the following form according to the Session-Description protocol for an MBMS-Download session with the FLUTE protocol:

v=0
o=user123 2890844526 2890842807 IN IP6
   2201.056D: : 112E : 144A: 1E24
S=File delivery session example
i=More Information
t=2873397496 2873404696
a=mbms-mode:broadcast 1234
a=FEC-declaration:0 encoding-id=1
a=source-filter: incl IN IP6 *
   2001:210: 1:2:240: 96FF :FE25:8EC9
a=flute-tsi:3
m=application 12345 FLUTE/UDP 0
C=IN IP6 FF1 E:03AD::7F2E: 172A:1E24/1
b=64
a=lang:EN
a=FEC:0
a=hrcr: 2000,128,0,1000 5000,256,0,1000 7000,384,0,1000
   13000, inf, 0, 1000
a=hrcr:      2200,128,10,990      5500,256,10,990 11000,384,10,990
   20000, inf, 10, 990

The respective first number in the HRCR attributes in the last two lines describes the delay time in milliseconds, the respective second number describes the play rate in kBit/s, the respective third number describes a loss rate of the channel multiplied by 1000 and the respective fourth number describes a probability of success for achieving the play rate multiplied by 1000.

With these parameters, the transmitter declares that a hypothetical reference receiver which observes an error-free channel, characterised by the third number as 0, will be able to play a data rate of up to 128 kBit/s if it waits for at least 2000 ms, will be able to play a data rate of up to 256 kBit/s if it waits for at least 5000 ms, will be able to play a data rate of up to 384 kBit/s if it waits for at least 7000 ms, and if it waits for at least 13000, it has received the entire file and will be able to play or process it all at once or completely, e.g. in the case of an image file or a program code.

With the second set of parameters, the transmitter declares that a hypothetical reference receiver which observes an error-free channel with a statistically independent packet loss rate of a maximum of 1%, characterised by the third number as 10, will be able with a probability of at least 99% to play a data rate of up to 128 kBit/s if it waits for at least 2200 ms, and so on. It is important that in this case the transmitter adopts a specific decoding process at the receiver. In MBMS, this decoding process is e.g. prescribed. In this case, the transmission rate is then fixed e.g. to 64 kBit/s, which is relayed by the field b-64 to the receiver.

LIST OF REFERENCES

TX: transmitting device
RX: receiving device
SRV: device
GEN: parameter generator
ST, ST1, STN: intermediate storage device
CTL: evaluating device
MP, MP1, MPN: media player
CH1: first channel
CH2: second channel
$B_1, \ldots, B_5$: transmission quantity
b(t): transmission quantity
$D_1, D_2, D_3, D_i, D_N$: delay time
d: effective delay time
r: playout rate
$R_1, R_2, R_3, R_N$: play rate
$T_0, \ldots, T_5$: points in time
$p_1, p_i, p_N$: loss probability
$S_1, S_i, S_N$: probability of success
HRR1, HRRN: hypothetical reference receiver
HRCR1, HRCRN: hypothetical reference channel receiver
HCH1, HCHN: hypothetical channel
FI: file
BL1, BL2, BL3, BLN: blocks

The invention claimed is:

1. A receiving device for receiving files via a first logical channel from a transmitting device, the receiving device comprising:
a receiver to receive, via a second logical channel, play parameters about a file that is being or is to be received, via the first logical channel, the play parameters being generated by the transmitting device and including (i) information about a play rate for the file, (ii) information corresponding to a delay time for the file, and (iii) information about a probability that the receiving device can achieve the play rate for the file; and
an evaluating device to receive the play parameters and to determine a start time to begin play back of the file based on the play parameters, so that the file can be played back while the file is being received by the receiving device, wherein the play parameters are received prior to the file being received by the receiving device.

2. The receiving device of claim 1, further comprising:
an intermediate storage device to receive the file and to provide a data stream of the file at the determined start time.

3. The receiving device of claim 2, wherein the intermediate storage device delivers the data stream at a constant bit rate.

4. The receiving device of claim 1, wherein the evaluating device determines the start time based further on reception conditions of the first logical channel and on file characteristics of the file.

5. The receiving device of claim 4, wherein the reception conditions of the first logical channel comprise a reception rate of data of the first logical channel.

6. The receiving device of claim 1, wherein the play parameters include a first indicator of transmission characteristics of the first logical channel.

7. The receiving device of claim 6, wherein the first indicator indicates a loss rate of the first logical channel.

8. The receiving device of claim 6, wherein the play parameters include a second indicator of transmission characteristics of the first logical channel.

9. The receiving device of claim 8, wherein the second indicator indicates a probability of buffering in the first logical channel.

10. The receiving device of claim 1, wherein the play parameters include information about a duration of time that the play parameters remain valid.

11. The receiving device of claim 1, wherein the receiving device is to receive the file, via the first logical channel, in blocks.

12. The receiving device of claim 11, wherein the receiving device is to receive the blocks with error correction data.

13. The receiving device of claim 11, wherein the receiving device is to receive the blocks sequentially.

14. The receiving device of claim 11, wherein the first logical channel comprises several partial channels, and wherein the receiving device is to receive the blocks in parallel via the partial channels.

15. The receiving device of claim 11, wherein the receiving device is to receive the blocks according to a spreading process or an interleaving process.

16. The receiving device of claim 11, wherein the receiving device is to receive the blocks repeatedly.

17. The receiving device of claim 11, wherein the receiving device is to receive the blocks using a fountain code.

18. The receiving device of claim 11, wherein the receiving device is to receive the blocks according to File Delivery over Unidirectional Transport (FLUTE) protocol.

19. A transmitting device for transmitting files via a first logical channel, the transmitting device comprising:
 a parameter generator device to generate play parameters about a file that is to be transmitted to a receiving device via the first logical channel, the play parameters including (i) information about a play rate for the file, (ii) information corresponding to a delay time for the file, and (iii) information about a probability that the receiving device can achieve the play rate for the file; and
 a transmitter to transmit the play parameters to the receiving device via a second logical channel, wherein the play parameters are transmitted to the receiving device prior to transmitting the file.

20. The transmitting device of claim 19, wherein the play parameters can be used by the receiving device to determine a start time to begin play back of the file.

21. The transmitting device of claim 19, wherein the play parameters include a first indicator of transmission characteristics of the first logical channel, the first indicator indicating a loss rate of the first logical channel.

22. The transmitting device of claim 21, wherein the play parameters include a second indicator of transmission characteristics of the first logical channel.

23. The transmitting device of claim 22, wherein the second indicator indicates a probability of buffering in the first logical channel.

24. The transmitting device of claim 19, wherein the play parameters include information about a duration of time that the play parameters remain valid.

25. The transmitting device of claim 19, further comprising:
 a storage device to store the play parameters.

26. A system, comprising:
 a receiving device; and
 a transmitting device to generate play parameters about a file that is to be transmitted to the receiving device via a first logical channel, the play parameters including (i) information about a play rate for the file, (ii) information corresponding to a delay time for the file, and (iii) information about a probability that the receiving device can achieve the play rate for the file, wherein the play parameters are to be transmitted to the receiving device via a second logical channel;
 wherein the receiving device determines a start time to begin play back of the file based on the play parameters, so that the file can be played back on the receiving device while the file is being received by the receiving device, wherein the transmitting device is to transmit the play parameters to the receiving device prior to transmitting the file.

27. The system of claim 26, wherein the play parameters include a first indicator of transmission characteristics of the first logical channel, the first indicator indicating a loss rate of the first logical channel.

28. The system of claim 27, wherein the play parameters include a second indicator of transmission characteristics of the first logical channel.

29. The system of claim 28, wherein the second indicator indicates a probability of buffering in the first logical channel.

30. The system of claim 26, wherein the play parameters include information about a duration of time that the play parameters remain valid.

31. A method for a receiving device to receive files from a transmitting device, comprising:
 receiving, via a second logical channel, play parameters about a file that is to be received via a first logical channel, the play parameters being generated by the transmitting device and including (i) information about a play rate for the file, (ii) information corresponding to a delay time for the file and (iii) information about a probability that the receiving device can achieve the play rate for the file;
 determining a start time to begin play back of the file based on the play parameters, so that the file can be played back while the file is being received by the receiving device, wherein the play parameters are received prior to the file being received by the receiving device; and
 initiating receipt of the file via the first channel.

32. The method of claim 31, wherein the file is buffered in an intermediate storage device and is provided as a data stream at the determined start time.

33. The method of claim 32, wherein the data stream is provided at a constant bit rate.

34. The method of claim 31, wherein the start time is further based on reception conditions of the first channel and on file characteristics of the file.

35. The method of claim 34, wherein the reception conditions of the first channel comprise a reception rate of data of the first logical channel.

36. The method of claim 31, wherein the play parameters include a first indicator of transmission characteristics of the first logical channel.

37. The method of claim 36, wherein the first indicator indicates a loss rate of the first logical channel.

38. The method of claim 36, wherein the play parameters include a second indicator of transmission characteristics of the first logical channel.

39. The method of claim 38, wherein the second indicator indicates a probability of buffering in the first logical channel.

40. The method of claim 31, wherein the play parameters include information about a duration of time that the play parameters remain valid.

41. A method for transmitting files to a receiving device, comprising:
 generating play parameters about a file that is to be transmitted to the receiving device via a first logical channel, the play parameters including (i) information about a play rate for the file, (ii) information corresponding to a delay time for the file, and (iii) information about a probability that the receiving device can achieve the play rate for the file;
 transmitting the play parameters to the receiving device via a second logical channel; and
 transmitting the file to the receiving device via the first logical channel after the play parameters are transmitted.

42. The method of claim 41, wherein the play parameters can be used by the receiving device to determine a start time to begin play back of the file.

43. The method of claim 41, wherein the play parameters include a first indicator of transmission characteristics of the first logical channel, the first indicator indicating a loss rate of the first logical channel.

44. The method of claim 43, wherein the play parameters include a second indicator of transmission characteristics of the first logical channel.

45. The method of claim 44, wherein the second indicator indicates a probability of buffering in the first logical channel.

46. The method of claim 41, wherein the play parameters include information about a duration of time that the play parameters remain valid.

* * * * *